US011276915B2

(12) United States Patent
Camacho Perez et al.

(10) Patent No.: US 11,276,915 B2
(45) Date of Patent: Mar. 15, 2022

(54) ANTENNAS INTEGRATED INTO A PRINTED CIRCUIT BOARD

(71) Applicant: Intel Corporation, Santa Clara, CA (US)

(72) Inventors: Jose Rodrigo Camacho Perez, Guadalajara Jalisco (MX); Aycan Erentok, Sunnyvale, CA (US); Huan-Sheng Hwang, San Diego, CA (US); Paul Beaucourt, Santa Clara, CA (US); Thomas H. Liu, Fremont, CA (US); Brian Girvin, Gilroy, CA (US)

(73) Assignee: Intel Corporation, Santa Clara, CA (US)

( * ) Notice: Subject to any disclaimer, the term of this patent is extended or adjusted under 35 U.S.C. 154(b) by 272 days.

(21) Appl. No.: 16/473,610

(22) PCT Filed: Mar. 27, 2017

(86) PCT No.: PCT/US2017/024373
§ 371 (c)(1),
(2) Date: Jun. 25, 2019

(87) PCT Pub. No.: WO2018/182569
PCT Pub. Date: Oct. 4, 2018

(65) Prior Publication Data
US 2020/0153080 A1 May 14, 2020

(51) Int. Cl.
*H01Q 1/22* (2006.01)
*H01Q 1/38* (2006.01)
(Continued)

(52) U.S. Cl.
CPC ........... *H01Q 1/2283* (2013.01); *H01Q 1/38* (2013.01); *H01Q 7/00* (2013.01); *H01Q 13/18* (2013.01)

(58) Field of Classification Search
CPC .................................................. H01Q 13/18
See application file for complete search history.

(56) References Cited

U.S. PATENT DOCUMENTS

2008/0238792 A1 10/2008 Heinrich et al.
2011/0012796 A1 1/2011 Kim et al.
(Continued)

FOREIGN PATENT DOCUMENTS

EP 2178158 A1 4/2010

OTHER PUBLICATIONS

Extended European Search Report dated Oct. 15, 2020 for European Patent Application No. 17903706.4, 15 pages.
(Continued)

*Primary Examiner* — Ricardo I Magallanes
(74) *Attorney, Agent, or Firm* — Schwabe, Williamson & Wyatt, P.C.

(57) ABSTRACT

Embodiments include apparatuses, methods, and systems including an electronic apparatus having a configurable sector cavity antenna integrated into a PCB. The configurable sector cavity antenna may include a first panel embedded within a first layer of the PCB along an edge of the first layer, and a second panel embedded within a second layer of the PCB along an edge of the second layer. The configurable sector cavity antenna may further include a fixed via wall to couple the first panel and the second panel along an inner edge of the first panel and the inner edge of the second panel, and a switchable via wall to selectively couple multiple interior points of the first panel and multiple interior points of the second panel. Other embodiments may also be described and claimed

25 Claims, 8 Drawing Sheets

(51) Int. Cl.
*H01Q 7/00* (2006.01)
*H01Q 13/18* (2006.01)

(56) References Cited

U.S. PATENT DOCUMENTS

| | | |
|---|---|---|
| 2013/0050032 A1 | 2/2013 | Shiu et al. |
| 2013/0088396 A1* | 4/2013 | Han .................. H01Q 9/04 343/700 MS |
| 2014/0240186 A1* | 8/2014 | Zhou .................. H01Q 21/205 343/772 |
| 2014/0354494 A1 | 12/2014 | Katz |
| 2015/0048979 A1 | 2/2015 | Asrani et al. |
| 2015/0214620 A1 | 7/2015 | Yosui |
| 2017/0047647 A1 | 2/2017 | Jung et al. |
| 2017/0110790 A1* | 4/2017 | Kim .................. H01Q 21/0062 |

OTHER PUBLICATIONS

Alireza Pourghorban Saghati et al., "A Reconfigurable SIW Cavity-Backed Slot Antenna With One Octave Tuning Range", May 15, 2013, 9 pages, vol. 61, No. 8, IEEE Transactions on Antennas and Propagation, IEEE Service Center, Piscataway, NJ, US.

Nguyen-Trong Nghia et al., A Frequency-and Polarization-Reconfigurable Circular Cavity Antenna, Oct. 10, 2016, 11 pages, vol. 16, IEEE Antennas and Wireless Propagation Letters.

International Search Report and Written Opinion dated Dec. 26, 2017 for International Patent Application No. PCT/US2017/024373, 11 pages.

* cited by examiner

ANTENNAS INTEGRATED INTO A PRINTED CIRCUIT BOARD

CROSS REFERENCE TO RELATED APPLICATIONS

The present application is a national phase entry under 35 U.S.C. § 371 of International Application No. PCT/US2017/024373, filed Mar. 27, 2017, entitled "ANTENNAS INTEGRATED INTO A PRINTED CIRCUIT BOARD", which designated, among the various States, the United States of America. The Specifications of the PCT/US2017/024373 Application is hereby incorporated by reference.

FIELD

Embodiments of the present invention relate generally to the technical field of communication, and more particularly to antennas integrated into a printed circuit board (PCB).

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Mobile devices, such as mobile telephones, tablet computers, phablets, wearable devices, Internet of Things (IoT) devices, etc., typically include circuitry for electronic processing and for communication to transmit and/or receive signals. Such devices may also include one or more antennas used in the communication. Wearable devices may be smart mobile devices, e.g., smartwatch, fitness wristbands, which can be worn on a body as implant or accessories. A computing device may be a mobile device, a wearable device, or other devices used in computing. The designs of mobile devices and wearable devices often consider both practical functions and fashionable appearances. Antenna integration into mobile devices and wearable devices faces significant challenges in the design and the manufacturing and assembly process of such devices.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
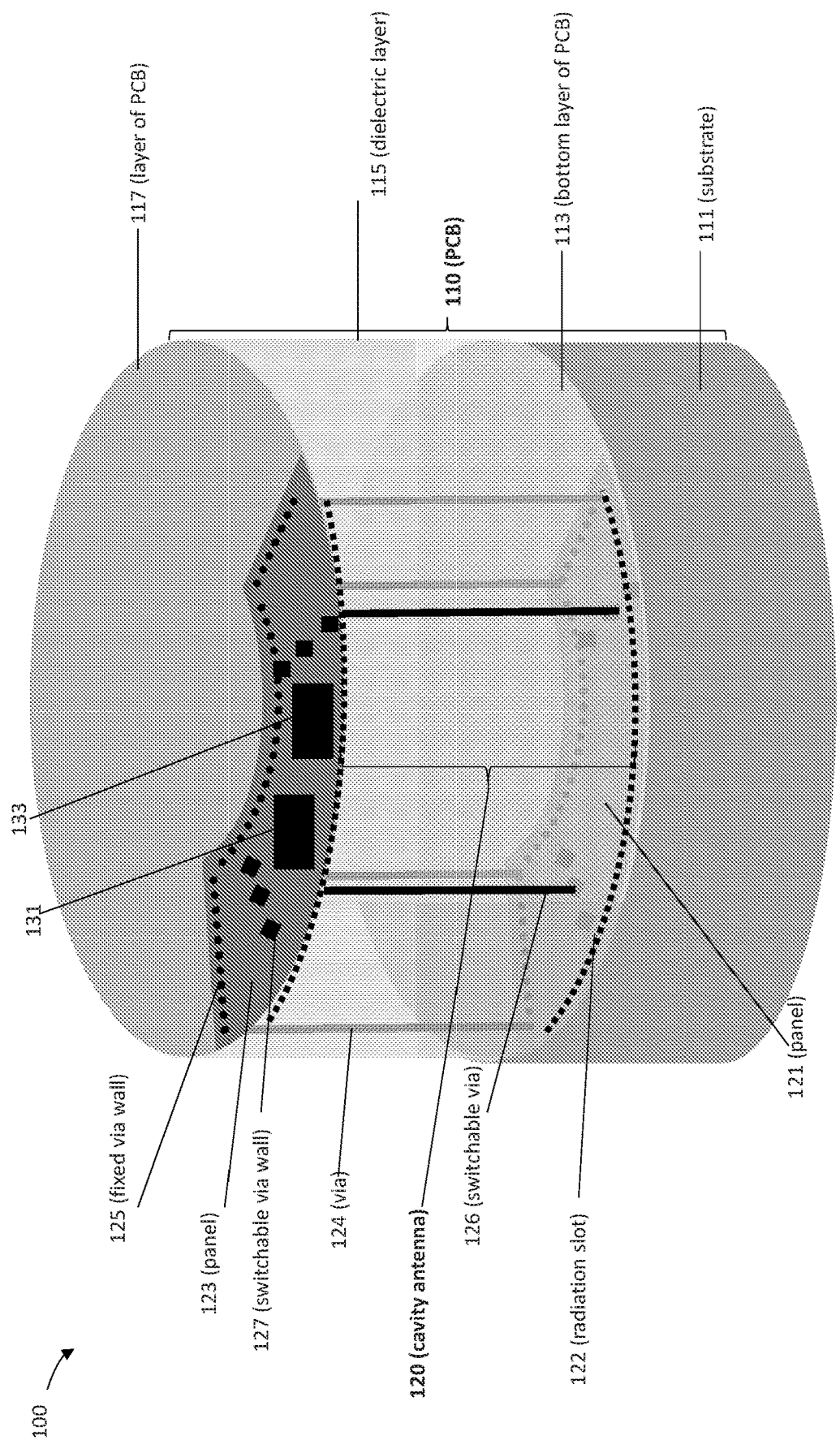
FIG. 1 illustrates a three-dimensional view of an example electronic apparatus including a configurable sector cavity antenna integrated into a printed circuit board (PCB), in accordance with various embodiments.

Antennas disclosed herein may satisfy various practical communication needs, while maintaining desirable appearances, which may be used for a mobile device, a wearable device, or a general computing device. A mobile device or a wearable device may include various electronic components and sub-systems assembled on a printed circuit board (PCB). A sector cavity antenna may be integrated into a PCB in a small form factor, e.g., a form factor for a wearable device. A sector cavity antenna may include a first panel embedded within a first layer of the PCB, and a second panel embedded within a second layer of the PCB. The first panel and the second panel may be located along an edge of the PCB, so that more antennas or other components may be placed on the PCB around a center or along remaining edges of the PCB. The first panel and the second panel may be coupled together along an inner edge by a fixed via wall including multiple vias, with a cavity formed between the first panel, the second panel, and the fixed via wall. In addition, the first panel and the second panel may form a radiation slot for the sector cavity antenna along the outer edge of the first panel and the outer edge of the second panel, where signals can be transmitted or received through the radiation slot.

A sector cavity antenna integrated into a PCB may be configurable by including a switchable via wall with multiple switchable vias. A switchable via may be configurable to selectively couple an interior point of the first panel of the sector cavity antenna with an interior point of the second panel of the sector cavity antenna, where a switchable via may be in on or off state. When the switchable vias of a switchable via wall are all in on state, the sector cavity antenna may have another cavity formed between the first panel, the second panel, and the switchable via wall, which is different from the cavity formed between the first panel, the second panel, and the fixed via wall.

Furthermore, two or more sector cavity antennas, configurable or not, may be integrated into the PCB to support multiband communications, multiple standard communications, or multiple in multiple out (MIMO) communications. Two or more sector cavity antennas may be placed along the edge of the PCB so that more space around a center of the PCB may be available for other purposes. For example, an additional coil antenna may be placed within a layer of the PCB around a contour of an inner edge of a panel of a sector cavity antenna. Multiple antennas, e.g., two or more sector cavity antennas, a coil antenna, integrated into the PCB may simultaneously support multiple standard communications.

For example, the multiple antennas may support communications for global navigation satellite system (GNSS), WiFi, global positioning system (GPS), MIMO communications, Glonass, near field communications (NFC), wireless personal area network (WPAN), a mobile body area networks (MBAN), Bluetooth®, ZigBee, a Z-Wave, or other communication technologies.

In embodiments, an electronic apparatus may include a PCB. A configurable sector cavity antenna may be integrated into the PCB, where the configurable sector cavity antenna may include a first panel embedded within a first layer of the PCB, and a second panel embedded within a second layer of the PCB. The first panel may include an inner edge and an outer edge, and the second panel may include an inner edge and an outer edge. The outer edge of the first panel may be an edge of the first layer of the PCB, and the outer edge of the second panel may be an edge of the second layer of the PCB. The configurable sector cavity antenna may further include a fixed via wall with multiple vias to couple the first panel and the second panel along the inner edge of the first panel and the inner edge of the second panel. A radiation slot may be formed between the first panel and the second panel along the outer edge of the first panel and the outer edge of the second panel. The configurable sector cavity antenna may further include a switchable via wall having multiple switchable vias configurable to selectively couple multiple interior points of the first panel and multiple interior points of the second panel.

In embodiments, an electronic apparatus may include a PCB. A sector cavity antenna may be integrated into the PCB, where the sector cavity antenna may include a first panel embedded within a first layer of the PCB, and a second panel embedded within a second layer of the PCB. The first panel may include an inner edge and an outer edge, and the second panel may include an inner edge and an outer edge. The outer edge of the first panel may be an edge of the first layer of the PCB, and the outer edge of the second panel may be an edge of the second layer of the PCB. The sector cavity antenna may further include a fixed via wall having multiple vias to couple the first panel and the second panel along the inner edge of the first panel and the inner edge of the second panel. A radiation slot may be formed between the first panel and the second panel along the outer edge of the first panel and the outer edge of the second panel. In addition, a coil antenna may be embedded within the first layer of the PCB around a contour of the inner edge of the first panel and an edge of the first layer of the PCB.

In embodiments, a computing device may include a processor, a memory device, a display module (or simply a display), and a PCB coupled together. A first sector cavity antenna and a second sector cavity antenna may be integrated into the PCB, where the first sector cavity antenna and the second sector cavity antenna may encircle a continuous opening around a center of the PCB.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A or B" and "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" or "routine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. As used herein, "computer-implemented method" may refer to any method executed by one or more processors, a computer system having one or more processors, a mobile device such as a smartphone (which may include one or more processors), a tablet, a laptop computer, a set-top box, a gaming console, and so forth.

FIG. 1 illustrates a three-dimensional view of an example electronic apparatus 100 including a configurable sector cavity antenna 120 integrated into a PCB 110, in accordance with various embodiments. For clarity, features of the PCB 110, may be described below as examples for understanding an example PCB. It is to be understood that there may be more or fewer layers for a PCB. Further, it is to be understood that one or more of the components within the PCB may include additional and/or varying features from the description below, and may include any device that one having ordinary skill in the art would consider and/or refer to as a PCB.

In embodiments, the PCB 110 may include a substrate 111, a first layer 113 above the substrate 111, a dielectric layer 115 above the first layer 113, and a second layer 117 above the dielectric layer 115. The configurable sector cavity antenna 120 may include a first panel 121, a second panel 123, and a radiation slot 122 between the first panel 121 and the second panel 123. The first panel 121 may be embedded within the first layer 113, while the second panel 123 may be embedded within the second layer 117. A fixed via wall 125 may include multiple vias 124 to couple the first panel 121 and the second panel 123. In addition, a switchable via wall 127 may include multiple switchable vias 126 configurable to selectively couple multiple interior points of the first panel 121 and the second panel 123 with each other, where a switchable via 126 may be in on or off state. A semiconductor package, e.g., a semiconductor package 131, or a semiconductor package 133, may be affixed to the second panel 123, or other locations of the PCB 110.

The PCB 110 may mechanically support and electrically connect electronic components using conductive tracks, pads and other features etched from copper sheets or other metal sheets laminated onto a non-conductive substrate 111. The substrate 111 may include epoxy resin, woven glass fabric reinforcement, brominated flame retardant, or others. The PCB 110 may be of a circular shape as shown in FIG. 1. However, other shapes, such as a square shape, a rectangular shape, an elliptical shape, or a polygon shape may be used for the PCB 110 as well.

The PCB 110 may be a double sided board with two metal layers, or a multi-layer board with multiple layers, e.g., the first layer 113 and the second layer 117. The multiple layers of the PCB 110 may include a metal layer, a ground layer, a power layer, a signal layer, or other layers. The first layer 113 or the second layer 117 may be a metal layer including a conductive metal or an alloy of metal, such as aluminum, copper, and/or steel alloy.

The PCB 110 may include the dielectric layer 115 separating the first layer 113 and the second layer 117. The dielectric layer 115 may be a woven glass reinforced layer, or a non-woven glass reinforced layer. The dielectric layer 115 may include a material that may be a poor conductor of electricity, such as porcelain, mica, glass, plastics and some metal oxides, or low-loss dielectrics. For example, the dielectric layer 115 may include Rogers TMM 10i material (e.g., dielectric constant is 9.8).

In some embodiments, the configurable sector cavity antenna 120 including the first panel 121, the second panel 123, the radiation slot 122 between the first panel 121 and the second panel 123, and the fixed via wall 125 may be integrated into the PCB 110. The configurable sector cavity antenna 120 may be used for fixed, single, narrow band communication. In other embodiments, the configurable sector cavity antenna 120 may be a part of multiple sector cavity antennas with regular or irregular dimensions and/or contours for multiband operation. The configurable sector cavity antenna 120 may be suitable for various wireless communications and systems, such as WiFi, Bluetooth® (BT), and long-term evolution (LTE), GNSS, GPS, MIMO communications, Glonass, NFC, WPAN, MBAN, ZigBee, a Z-Wave, or other communication technologies.

The configurable sector cavity antenna 120 may include the first panel 121 and the second panel 123 embedded into the PCB 110. The first panel 121 may be embedded within the first layer 113, while the second panel 123 may be embedded within the second layer 117. The first panel 121 and the second panel 123 may be conductive at least at their inner faces and may form a top ground and a bottom ground, respectively, for the configurable sector cavity antenna 120. The first panel 121 and the second panel 123 may be formed of conductive metal or may be formed of another material and may include a conductive coating or layer at respective inner faces.

The fixed via wall 125 including multiple vias 124 may couple the first panel 121 and the second panel 123 to form a cavity that may contain or may be filled by a dielectric material for the dielectric layer 115. In embodiments, the fixed via wall 125 may form a non-radiating face and may be conductive at least at its inner face, in a manner similar to the first panel 121 and the second panel 123. The cavity formed by the first panel 121, the second panel 123, and the fixed via wall 125 may contain electromagnetic (EM) waves that may reflect back and forth between conductive cavity walls of the first panel 121, the second panel 123, and the fixed via wall 125. The radiation slot 122 may be an opening for the cavity formed by the fixed via wall 125, the first panel 121, and the second panel 123. The radiation slot 122 may be open so as to receive and/or transmit communications.

In addition, a switchable via wall 127 may include multiple switchable vias 126 configurable to selectively couple multiple interior points of the first panel 121 and the second panel 123 with each other, where a switchable via 126 may be in on or off state. A switchable via 126 may be configurable to selectively couple an interior point of the first panel 121 with an interior point of the second panel 123 when the switchable via 126 may be in on state. When the switchable vias 126 of the switchable via wall 127 are all in on state, the configurable sector cavity antenna 120 may have another cavity formed between the first panel 121, the second panel 123, and the switchable via wall 127, which is different from the cavity formed between the first panel 121, the second panel 123, and the fixed via wall 125. The cavity formed between the first panel 121, the second panel 123, and the switchable via wall 127 may have different performance and operational parameters induced by the different volume of the cavity.

In embodiments, the semiconductor package 131 or the semiconductor package 133 may include radio circuitry or digital circuitry. The semiconductor package 131, or the semiconductor package 133, affixed to second panel 123, or other locations of the PCB 110, may include digital and/or analog circuitry to provide digital data processing as well as wireless communications. Optionally, the semiconductor package 131, or the semiconductor package 133 may be shielded from the configurable sector cavity antenna 120 by a shield layer (not shown). The semiconductor package 131, or the semiconductor package 133 may be coupled to the via 124 or the switchable via 126 to transmit or receive communications.

Figure 2:
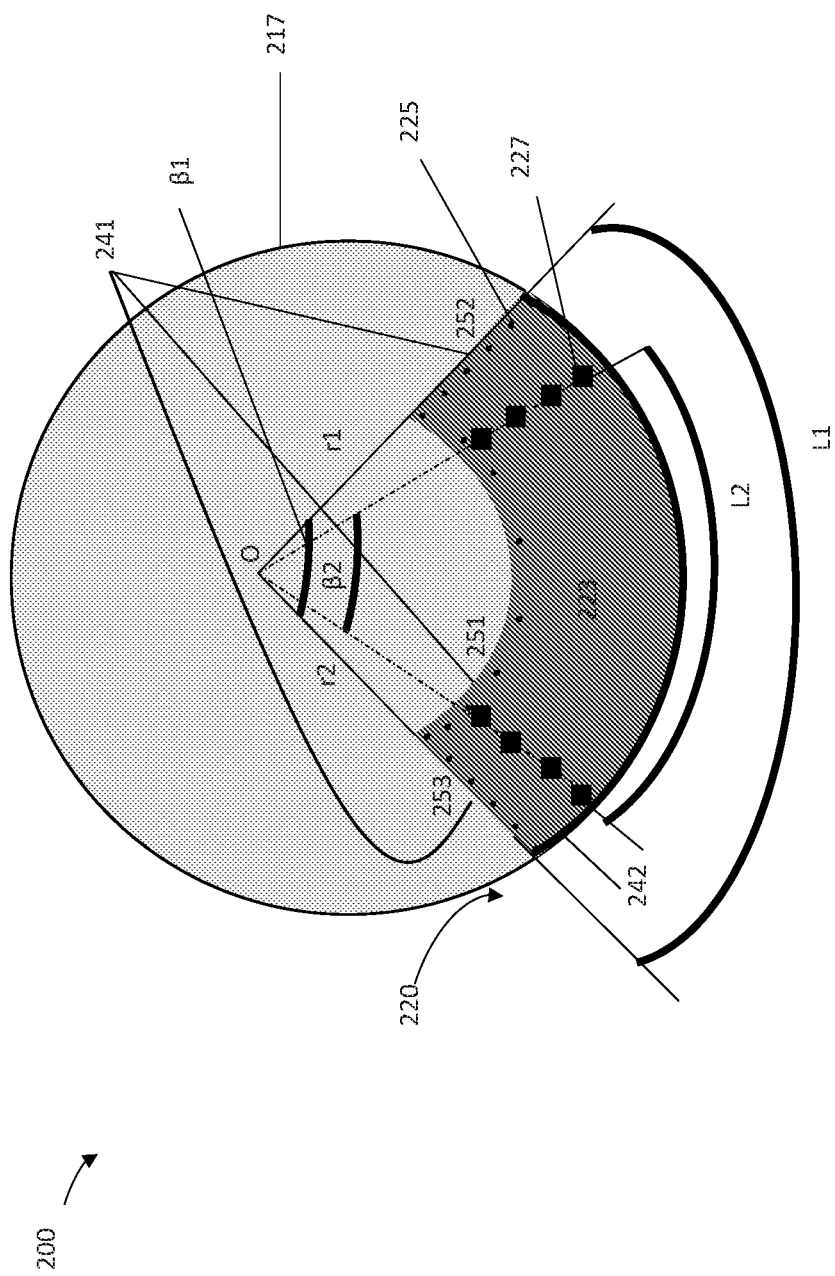
FIG. 2 illustrates a top view of an example electronic apparatus including a configurable sector cavity antenna integrated into a PCB, in accordance with various embodiments.

FIG. 2 illustrates a top view of an example electronic apparatus 200 including a configurable sector cavity antenna 220 integrated into a PCB, in accordance with various embodiments. At the top view, the PCB has a layer 217 as shown. Other layers of the PCB may be beneath or above the layer 217, not shown. The configurable sector cavity antenna 220 may include a panel 223 embedded into the layer 217. The electronic apparatus 200 may be an example of the electronic apparatus 100 shown in FIG. 1. For example, the layer 217 may be an example of the second layer 117, the panel 223 may be an example of the second panel 123 of the configurable sector cavity antenna 120, and the configurable sector cavity antenna 220 may be an example of the configurable sector cavity antenna 120, as shown in FIG. 1.

In more detail, the layer 217 may be a circle with a center O and a radius r1. The panel 223 may be a segment of a circular section with a sector angle β1, and may be embedded along the edge of the layer 217. The panel 223 may include an inner edge 241 and an outer edge 242 with a length L1. The inner edge 241 may include a segment 251 of a smaller circle sharing the center O with the layer 217, where the smaller circle has a radius r2 that is less than r1. The inner edge 241 may also include a radius segment 252 and a radius segment 253. The outer edge 242 may also be an edge of the circle for the layer 217 of the PCB. Various embodiments may have different selections of r1 and r2. For example, the selection of r1 may be mainly constrained by the desired form-factor of a host device for the PCB. On the other hand, if r2>0, there is a space around the center O not occupied by the configurable sector cavity antenna 220, which may be used as an opening to accommodate crossing wires or components and/or a NFC coil. In some embodiments, the radius r2 may be 0.

The panel 223 may be a top ground of the configurable sector cavity antenna 220, where a bottom ground of the configurable sector cavity antenna 220 is not shown. The configurable sector cavity antenna 220 may further include a fixed via wall 225 and a switchable via wall 227, which may be an example of the fixed via wall 125 and the switchable via wall 127 as shown in FIG. 1. The fixed via wall 225 may be placed along the inner edge 241 of the panel 223. The switchable via wall 227 may form a circular section with a sector angle β2 that is smaller than the sector angle β1. The switchable via wall 227 may define an outer edge with a length L2, which is smaller than the length L1 of the outer edge 242.

The panel 223, the bottom ground, and the fixed via wall 225 may form a cavity for the configurable sector cavity antenna 220, with a volume depending on the sector angle β1 and the thickness between the panel 223 and the bottom ground. The performance and operation parameters of the configurable sector cavity antenna 220 may be dependent on the volume, which depends on the sector angle β1. The sector angle β1 may be different for different embodiments. When the sector angle β1 is less than 360 degree, the configurable sector cavity antenna 220 may not fully occupy the PCB, and additional components or openings may be formed in the PCB at the space not occupied by the configurable sector cavity antenna 220. On the other hand, when an embodiment has a sector angle β1=360, a single sector cavity antenna may occupy the entire PCB surface.

Additionally and alternatively, the panel 223, the bottom ground, and the switchable via wall 227 may form another cavity of a different volume depending on the sector angle β2, for the configurable sector cavity antenna 220. The switchable via wall 227 may be an array of electronic switches, where a switchable via may be in on or off state. When the switchable vias within the switchable via wall 227 are all in on state, the configurable sector cavity antenna 220 may have a volume determined by the sector angle β2, which is different from the volume determined by the sector angle β1 the fixed via wall 225. The ability to change the volume and hence the performance of the configurable sector cavity antenna 220 by the switchable via wall 227 may be referred to as a technique for tuning the configurable sector cavity antenna 220. Besides tuning using the switchable via wall 227, other techniques, e.g., a tunable capacitor, not shown, may be used for additional tuning by placing the tunable capacitor at a strategic location of the cavity of the configurable sector cavity antenna 220.

Figure 3:
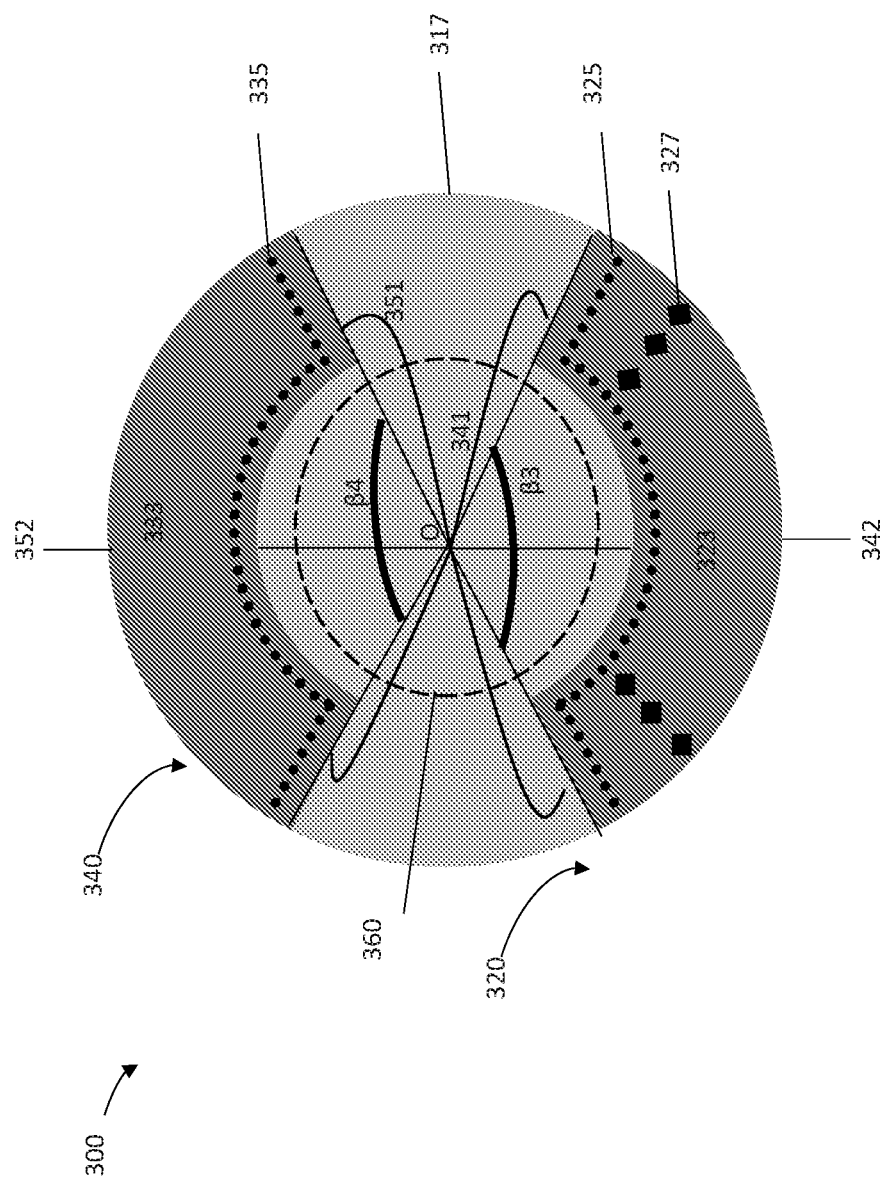
FIG. 3 illustrates a top view of an example electronic apparatus including a configurable sector cavity antenna and another sector cavity antenna integrated into a PCB, in accordance with various embodiments.

FIG. 3 illustrates a top view of an example electronic apparatus 300 including a configurable sector cavity antenna 320 and another sector cavity antenna 340 integrated into a PCB, in accordance with various embodiments. At the top view, the PCB has a layer 317 as shown. Other layers of the PCB may be beneath or above the layer 317, not shown. The configurable sector cavity antenna 320 may include a panel 323 embedded into the layer 317. The electronic apparatus 300 may be an example of the electronic apparatus 100 shown in FIG. 1. For example, the layer 317 may be an example of the second layer 117, the panel 323 may be an example of the second panel 123 of the configurable sector cavity antenna 120, and the configurable sector cavity antenna 320 may be an example of the configurable sector cavity antenna 120, as shown in FIG. 1.

In more detail, the layer 317 may be a circle with a center O. The panel 323 may be a segment of a circular section with a sector angle β3, and may be embedded along the edge of the layer 317. The panel 323 may include an inner edge 341 and an outer edge 342. The inner edge 341 may include multiple segments. The outer edge 342 may also be an edge of the circle for the layer 317 of the PCB. The configurable sector cavity antenna 320 may further include a fixed via wall 325 and a switchable via wall 327, which may be an example of the fixed via wall 125 and the switchable via wall 127 as shown in FIG. 1. The fixed via wall 325 may be placed along the inner edge 341 of the panel 323. The switchable via wall 327 may include multiple switchable vias configurable to selectively couple multiple interior points of the panel 323 with another panel of the configurable sector cavity antenna 320. The switchable via wall 327 may form a smaller circular section compared to the fixed via wall 325, similar to the switchable via wall 227 shown in FIG. 2.

Another sector cavity antenna 340 may be embedded into the PCB as well. Another sector cavity antenna 340 may include a panel 333 embedded along the edge of the layer 317. The panel 333 may be a segment of a circular section with a sector angle β4. In embodiments, the sector angle β4 of another sector cavity antenna 340 may be different from the sector angle β3 of the sector cavity antenna 320, while in some other embodiments, the sector angle β4 may be the same as the sector angle β3. The panel 333 may include an inner edge 351 and an outer edge 352. The inner edge 351 may include multiple segments. The outer edge 352 may also be an edge of the circle for the layer 317 of the PCB.

The sector cavity antenna 340 may further include a fixed via wall 335, which may be an example of the fixed via wall 125 as shown in FIG. 1. The fixed via wall 335 may be placed along the inner edge 351 of the panel 333. The sector cavity antenna 340 may be without a switchable via wall and may not be configurable. In some other embodiments, the sector cavity antenna 340 may be configurable with a switchable via wall, not shown.

There may be a continuous space 360 of the layer 317 not occupied by the configurable sector cavity antenna 320 and another sector cavity antenna 340. The continuous space 360 may be around the center O of the layer 317, since the configurable sector cavity antenna 320 and another sector cavity antenna 340 may be placed around the edge of the layer 317. In some embodiments, as shown in FIG. 3, the continuous space 360 of the layer 317 may not be open. In some other embodiments, similar to the example shown in FIG. 4, the continuous space 360 may be open.

Figure 4:
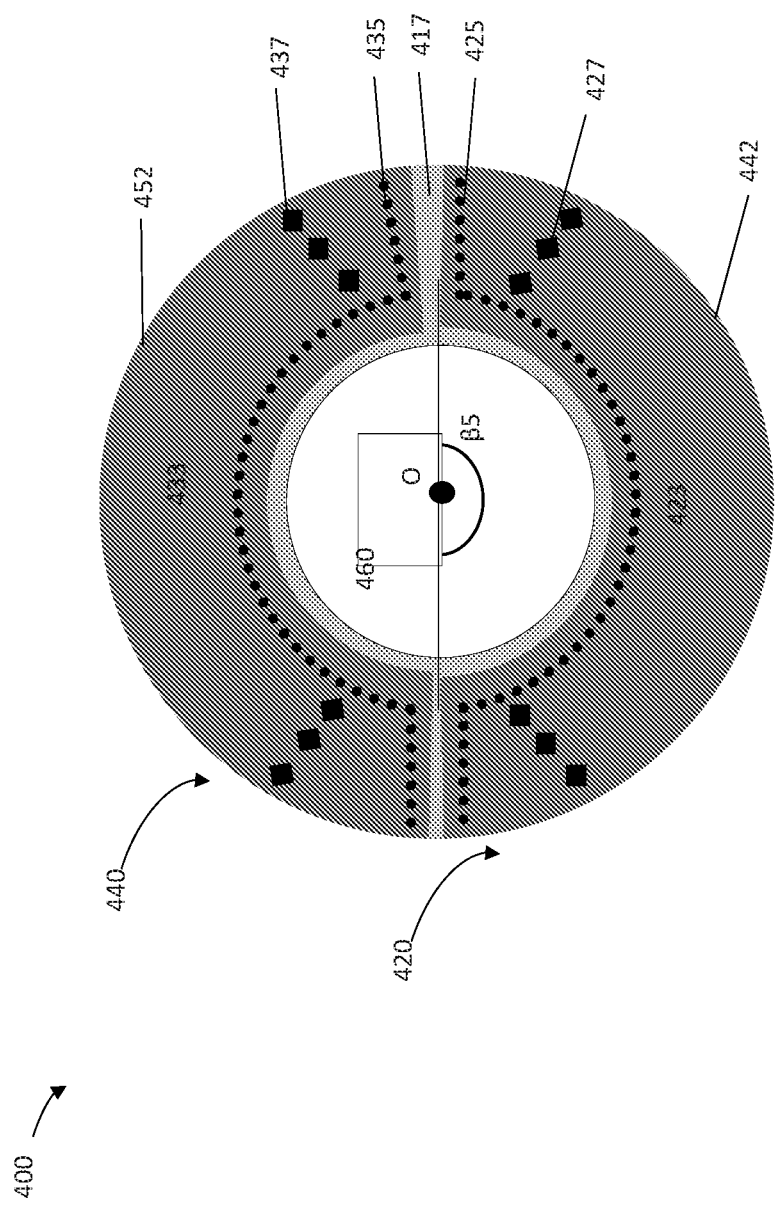
FIG. 4 illustrates a top view of another example electronic apparatus including a configurable sector cavity antenna and another sector cavity antenna integrated into a PCB, in accordance with various embodiments.

FIG. 4 illustrates a top view of an example electronic apparatus 400 including a configurable sector cavity antenna 420 and another sector cavity antenna 440 integrated into a PCB, in accordance with various embodiments. At the top view, the PCB may have a layer 417 as shown. Other layers of the PCB may be beneath or above the layer 417, not shown. The configurable sector cavity antenna 420 may include a panel 423 embedded into the layer 417. The electronic apparatus 400 may be an example of the electronic apparatus 100 shown in FIG. 1. For example, the layer 417 may be an example of the second layer 117, the panel 423 may be an example of the second panel 123 of the configurable sector cavity antenna 120, and the configurable sector cavity antenna 420 may be an example of the configurable sector cavity antenna 120, as shown in FIG. 1.

In more detail, the layer 417 may be a circle with a center O. The panel 423 may be a segment of a circular section with a sector angle β5, and may be embedded along the edge of the layer 417. In embodiments, the sector angle β5 may be around 180 degree, while the panel 423 may occupy almost half of circular section around the layer 417, encircling a continuous opening 460 around the center O. The panel 423 may include an inner edge and an outer edge 442, where the outer edge 442 may also be an edge of the circle for the layer 417 of the PCB. The configurable sector cavity antenna 420 may further include a fixed via wall 425 and a switchable via wall 427, which may be an example of the fixed via wall 125 and the switchable via wall 127 as shown in FIG. 1. The fixed via wall 425 may be placed along the inner edge of the panel 423. The switchable via wall 427 may include multiple switchable vias configurable to selectively couple multiple interior points of the panel 423 with another panel of the configurable sector cavity antenna 420. The switchable via wall 427 may form a smaller circular section compared to the fixed via wall 425, similar to the switchable via wall 227 shown in FIG. 2.

Another sector cavity antenna 440 may be embedded into the PCB as well. Another sector cavity antenna 440 may include a panel 433 embedded along the edge of the layer 417. The panel 433 may include an inner edge and an outer edge 452. The outer edge 452 may also be an edge of the circle for the layer 417 of the PCB. Another sector cavity antenna 440 may further include a fixed via wall 435. In addition, another sector cavity antenna 440 may be configurable and may include a switchable via wall 437. The fixed via wall 435 may be placed along the inner edge of the panel 433. The switchable via wall 427 may include multiple switchable vias configurable to selectively couple multiple interior points of the panel 423 with another panel of the configurable sector cavity antenna 420. The switchable via wall 427 may form a smaller circular section compared to the fixed via wall 425, similar to the switchable via wall 227 shown in FIG. 2. In some other embodiments, another sector cavity antenna 440 may be without a switchable via wall and may not be configurable.

There may be a continuous opening 460 of the layer 417 encircled by the configurable sector cavity antenna 420 and another sector cavity antenna 440. The continuous opening 460 may be around the center O of the layer 417, since the configurable sector cavity antenna 420 and another sector cavity antenna 440 may be placed around the edge of the layer 417. In some other embodiments, crossing wires or components a host device, e.g., a wearable device, may be placed within the continuous opening 460, so that the host device may have a better appearance.

Figure 5:
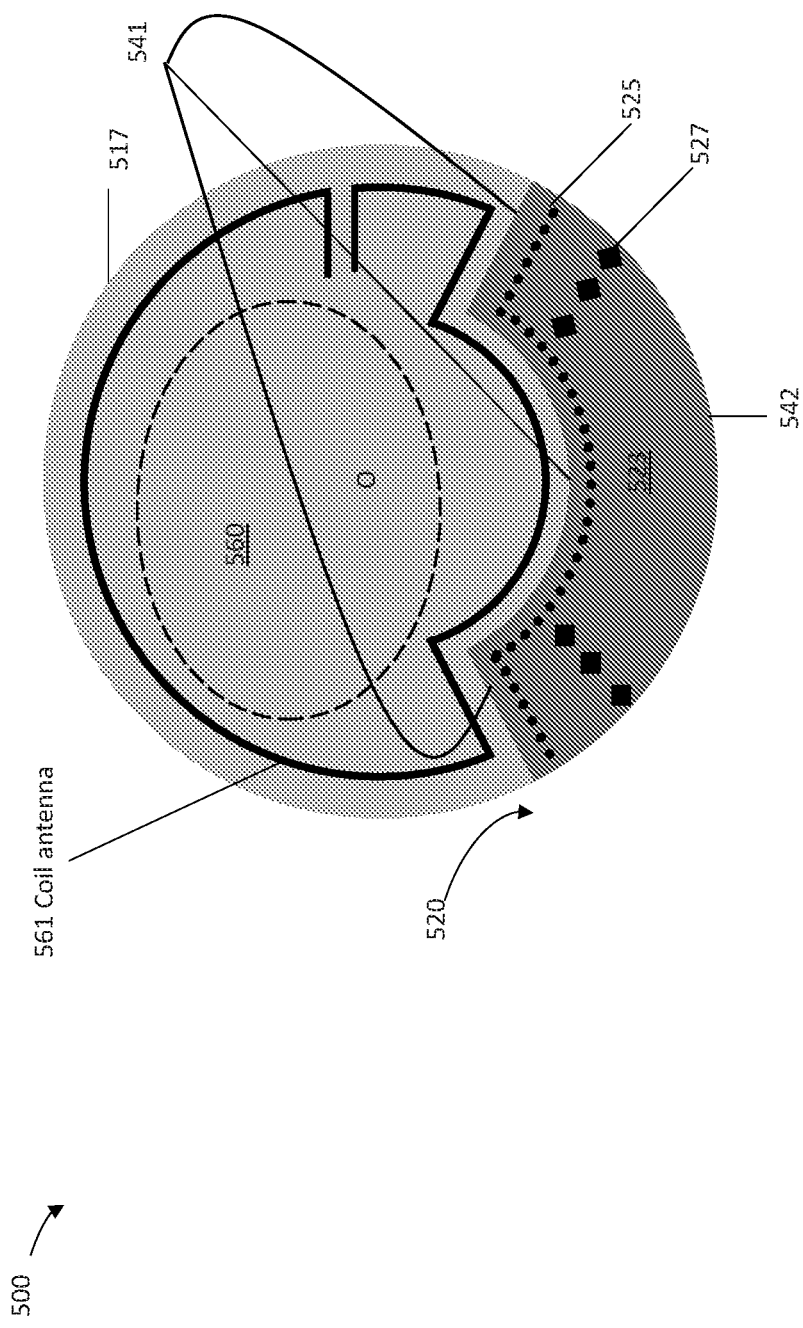
FIG. 5 illustrates a top view of an example electronic apparatus including a coil antenna and a configurable sector cavity antenna integrated into a PCB, in accordance with various embodiments.

FIG. 5 illustrates a top view of an example electronic apparatus 500 including a coil antenna 561 and a configurable sector cavity antenna 520 integrated into a PCB, in accordance with various embodiments. At the top view, the PCB may have a layer 517 as shown. Other layers of the PCB may be beneath or above the layer 517, not shown. The configurable sector cavity antenna 520 may include a panel 523 embedded into the layer 517. The electronic apparatus 500 may be an example of the electronic apparatus 100 shown in FIG. 1. For example, the layer 517 may be an example of the second layer 117, the panel 523 may be an example of the second panel 123 of the configurable sector cavity antenna 120, and the configurable sector cavity antenna 520 may be an example of the configurable sector cavity antenna 120, as shown in FIG. 1.

In more detail, the layer 517 may be a circle with a center O. The panel 523 may be a segment of a circular section, and may be embedded along the edge of the layer 517. The panel 523 may include an inner edge 541 and an outer edge 542, where the outer edge 542 may also be an edge of the circle for the layer 517 of the PCB. The configurable sector cavity antenna 520 may further include a fixed via wall 525 and a switchable via wall 527, which may be an example of the fixed via wall 125 and the switchable via wall 127 as shown in FIG. 1. The fixed via wall 525 may be placed along the inner edge 541 of the panel 523. The switchable via wall 527 may include multiple switchable vias configurable to selectively couple multiple interior points of the panel 523 with another panel of the configurable sector cavity antenna 520.

The coil antenna 561 may be embedded along the edge of the layer 517 and around a contour of the inner edge 541 of the panel 523 of the configurable sector cavity antenna 520. The coil antenna 561 may include a conductive wire, to conduct NFC. In various embodiments, the coil antenna 561 may have different geometry with different contour and number of turns.

There may be a continuous space 560 of the layer 517 not occupied by the configurable sector cavity antenna 520 and the coil antenna 561. The continuous space 560 may be around the center O of the layer 517, since the configurable sector cavity antenna 520 and the coil antenna 561 may be placed around the edge of the layer 517. In some other embodiments, the continuous space 560 may be an opening of the PCB, so that crossing wires or components a host device, e.g., a wearable device, may be placed within the opening.

Figure 6:
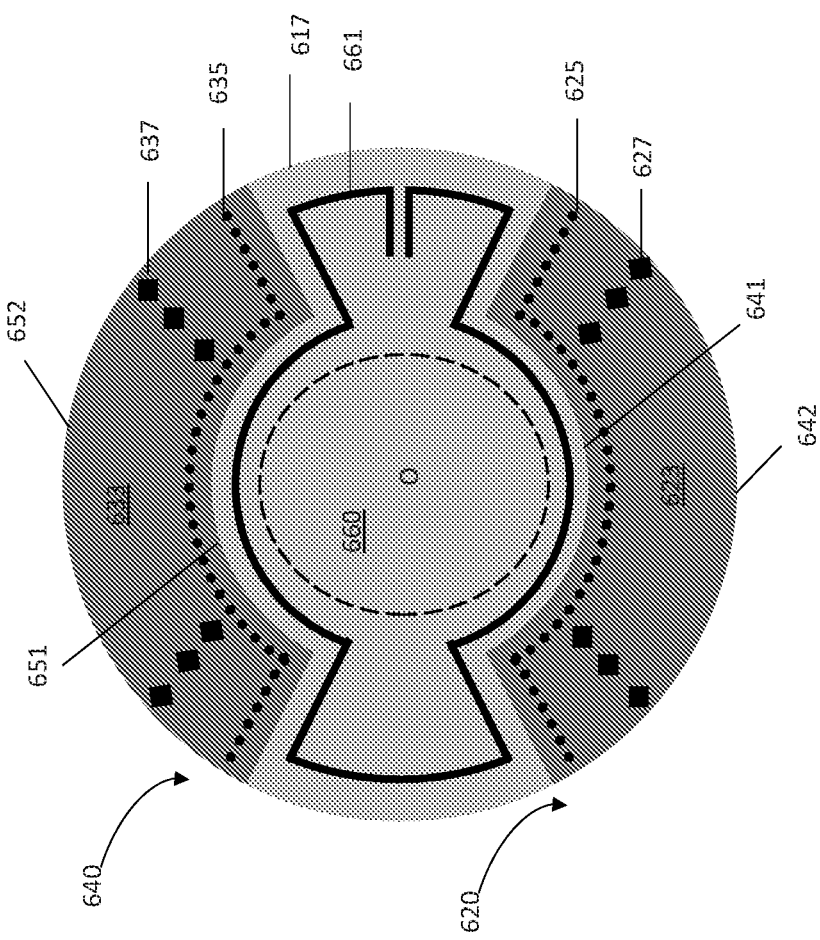
FIG. 6 illustrates a top view of an example electronic apparatus including a coil antenna, a configurable sector cavity antenna, and a sector cavity antenna integrated into a PCB, in accordance with various embodiments.

FIG. 6 illustrates a top view of an example electronic apparatus 600 including a coil antenna 661, a configurable sector cavity antenna 620, and a sector cavity antenna 640 integrated into a PCB, in accordance with various embodiments. At the top view, the PCB may have a layer 617 as shown. Other layers of the PCB may be beneath or above the layer 617, not shown. The configurable sector cavity antenna 620 may include a panel 623 embedded into the layer 617. The electronic apparatus 600 may be an example of the electronic apparatus 100 shown in FIG. 1. For example, the layer 617 may be an example of the second layer 117, the panel 623 may be an example of the second panel 123 of the configurable sector cavity antenna 120, and the configurable sector cavity antenna 620 may be an example of the configurable sector cavity antenna 120, as shown in FIG. 1. In embodiments, the configurable sector cavity antenna 620 and another sector cavity antenna 640 may be used to conduct MIMO communication, and the coil antenna 661 may be used to conduct NFC.

In more detail, the layer 617 may be a circle with a center O. The configurable sector cavity antenna 620 may include the panel 623, a fixed via wall 625 and a switchable via wall 627. The panel 623 may be a segment of a circular section, and may be embedded along the edge of the layer 617. The panel 623 may include an inner edge 641 and an outer edge 642, where the outer edge 642 may also be an edge of the circle for the layer 617 of the PCB. The fixed via wall 625 may be placed along the inner edge of the panel 623. The switchable via wall 627 may include multiple switchable vias configurable to selectively couple multiple interior points of the panel 623 with another panel of the configurable sector cavity antenna 620.

Another sector cavity antenna 640 may be embedded into the PCB as well. Another sector cavity antenna 640 may include a panel 633 embedded along the edge of the layer 617. The panel 633 may include an inner edge 651 and an outer edge 652. The outer edge 652 may also be an edge of the circle for the layer 617 of the PCB. Another sector cavity antenna 640 may further include a fixed via wall 635, and a switchable via wall 637. The fixed via wall 635 may be placed along the inner edge 651 of the panel 633. In some other embodiments, another sector cavity antenna 640 may be without a switchable via wall and may not be configurable.

The coil antenna 661 may be embedded along the edge of the layer 617, around a contour of the inner edge 641 of the panel 623 of the configurable sector cavity antenna 620, and around a contour of the inner edge 651 of the panel 633 of the configurable sector cavity antenna 640. There may be a continuous space 660 of the layer 617 not occupied by the configurable sector cavity antenna 620, another sector cavity antenna 640, and the coil antenna 661. The continuous space 660 may be around the center O of the layer 617. In some other embodiments, the continuous space 660 may be opening of the PCB, so that crossing wires or components a host device, e.g., a wearable device, may be placed within the opening.

Figure 7:
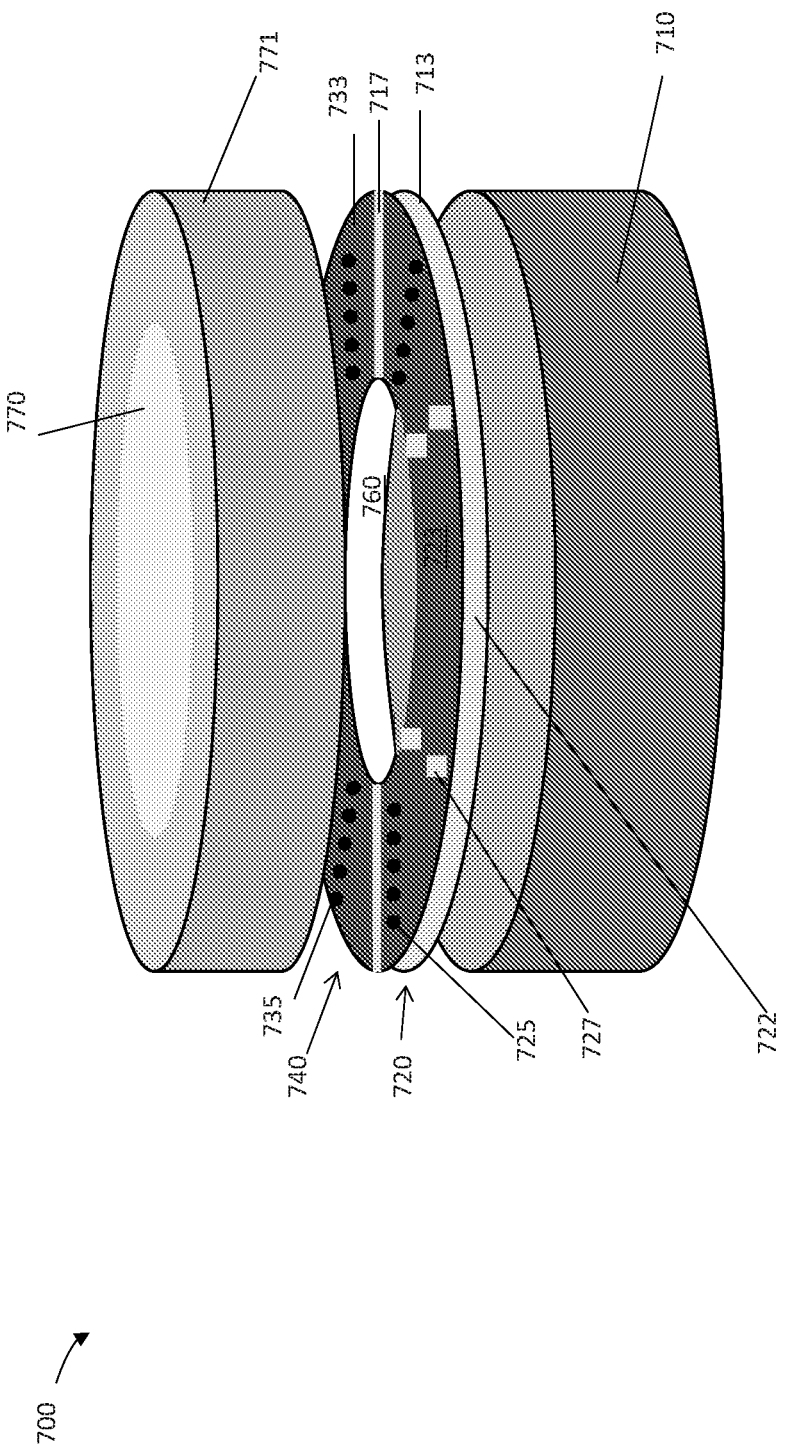
FIG. 7 illustrates a three-dimensional view of an example computing device with a display module, a PCB with an integrated configurable sector cavity antenna, and a device body, in accordance with various embodiments.

FIG. 7 illustrates a three-dimensional view of an example computing device 700 with a display module 770, a PCB with an integrated configurable sector cavity antenna 720, and a device body 710, in accordance with various embodiments. The PCB may include a layer 717 and a layer 713. In addition, the computing device 700 may include another sector cavity antenna 740 integrated into the PCB. The PCB with the configurable sector cavity antenna 720 within the computing device 700 may be an example of the electronic apparatus 100 shown in FIG. 1. For example, the layer 717 may be an example of the second layer 117, the layer 713 may be an example of the first layer 113, and the configurable sector cavity antenna 720 may be an example of the configurable sector cavity antenna 120, as shown in FIG. 1.

In embodiments, the computing device 700 may be a ring shaped smartwatch. In some other embodiments, the computing device 700 may be further integrated into eyeglasses or other wearable devices, with a variety of industrial or cosmetic designs that may use various combinations of metals or plastics materials and components. The size, form-factor, and/or configuration of the computing device 700 may determine the size of the configurable sector cavity antenna 720 integrated into the PCB included in the computing device 700.

In more detail, the configurable sector cavity antenna 720 may include a panel 723 integrated into the layer 717 of the PCB, and another panel integrated into the layer 713 of the PCB. The panel 723 may be a segment of a circular section with a sector angle of about 180 degree, and may be embedded along the edge of the layer 717. In embodiments, the panel 723 may occupy almost half of circular section around the layer 717. The configurable sector cavity antenna 720 may include a fixed via wall 725 and a switchable via wall 727, which may be an example of the fixed via wall 125 and the switchable via wall 127 as shown in FIG. 1. A radiation slot 722 may be formed between the panel 723 and another panel integrated into the layer 713 of the PCB. In embodiments, integrated circuitry, e.g., digital circuitry and radio frequency (RF) components, not shown, may be affixed to the PCB or the panel 723.

Another sector cavity antenna 740 may be embedded into the PCB as well. Another sector cavity antenna 740 may include a panel 733 embedded along the edge of the layer 717. Another sector cavity antenna 740 may further include a fixed via wall 735. There may be a switchable via wall for another sector cavity antenna 740, not shown. In some other embodiments, another sector cavity antenna 740 may be without a switchable via wall and may not be configurable.

There may be a continuous opening 760 of the PCB not occupied by the configurable sector cavity antenna 720 and another sector cavity antenna 740. The continuous space 760 may be around the center of the layer 717, since the configurable sector cavity antenna 720 and another sector cavity antenna 740 may be placed around the edge of the layer 717. In some embodiments, crossing wires or components of the computing device may be placed within the opening.

The computing device 700 may include the display module 770 located above the PCB and the configurable sector cavity antenna 720, and the device body 710. The computing device 700, the display module 770, and the device body 710 may be ring shaped. The configurable sector cavity antenna 720 may be located under the display module 770, and/or on the device body 710. Other components may be placed between the display module 770 and the configurable sector cavity antenna 720. Alternatively, the configurable sector cavity antenna 720 may be located directly underneath the display module 770. The display module 770 may further include a metallic extension 771. In embodiments, when the display module 770 is assembled together with the configurable sector cavity antenna 720, the metallic extension 771 may be located in front of the radiation slot 722 of the configurable sector cavity antenna 720 to conceal the radiation slot 722 while allowing for radiation through the radiation slot 722.

Figure 8:
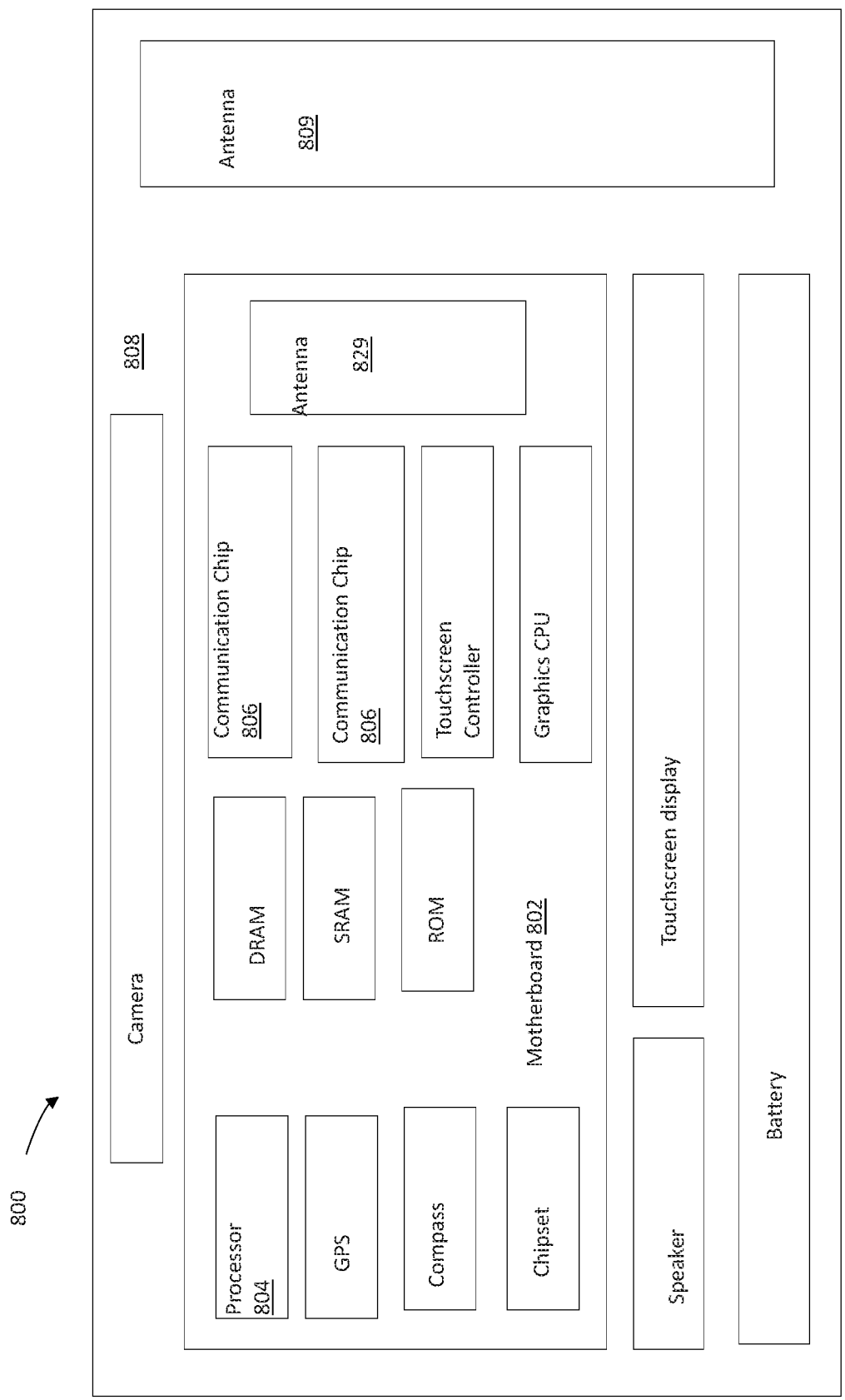
FIG. 8 illustrates an example computing device that may employ the apparatuses and/or methods described herein, according to various embodiments.

FIG. 8 illustrates an example computing device 800 that may employ the apparatuses and/or methods described herein, according to various embodiments.

Components of the computing device 800 may be housed in an enclosure (e.g., housing 808). The motherboard 802 may include a number of components, including but not limited to a processor 804 and at least one communication chip 806. In embodiments, the motherboard 802 may include an antenna 829, which may be similar to the PCB 110 including the configurable sector cavity antenna 120, as shown in FIG. 1. The processor 804 may be physically and electrically coupled to the motherboard 802. In some implementations, the at least one communication chip 806 may also be physically and electrically coupled to the motherboard 802. In further implementations, the communication chip 806 may be part of the processor 804. In addition, the computing device 800 may further include another antenna 809 outside the motherboard 802.

Depending on its applications, the computing device 800 may be an example of the computing device 700 shown in FIG. 7. For example, the computing device 800 may include a display, or a touchscreen display, similar to the display module 770 shown in FIG. 7, while the antenna 829 on the motherboard 802 may be similar to the configurable sector cavity antenna 720 integrated on the PCB.

In addition, the computing device 800 may include other components that may or may not be physically and electrically coupled to the motherboard 802. These other components may include, but are not limited to, volatile memory (e.g., dynamic random-access memory (DRAM)), static random access memory (SRAM), non-volatile memory (e.g., Read-only memory (ROM)), flash memory, a graphics central processing unit (CPU), a digital signal processor, a crypto processor, a chipset, a touchscreen controller, a battery, an audio codec, a video codec, a power amplifier, a global positioning system (GPS) device, a compass, a Geiger counter, an accelerometer, a gyroscope, a speaker, a camera, and a mass storage device (such as hard disk drive, compact disk (CD), digital versatile disk (DVD), and so forth).

The communication chip 806 may enable wireless communications for the transfer of data to and from the computing device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 806 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible broadband wireless access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 806 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 806 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 806 may operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication chip 806 may operate in accordance with other wireless protocols in other embodiments.

The computing device 800 may include a plurality of communication chips 806. For instance, a first communication chip 806 may be dedicated to shorter range wireless communications such as Wi-Fi and Bluetooth and a second communication chip 806 may be dedicated to longer range wireless communications such as GPS, EDGE, GPRS, CDMA, WiMAX, LTE, EV-DO, and others.

In various implementations, the computing device 800 may be a mobile device, a laptop, a netbook, a notebook, an ultrabook, a smartphone, a tablet, a personal digital assistant (PDA), an ultra mobile PC, a mobile phone, a digital camera, a portable music player, or a digital video recorder. In further implementations, the computing device 800 may be any other electronic device that processes data.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment are chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may include an electronic apparatus, comprising: a printed circuit board (PCB), wherein the PCB has a first layer and a second layer on a substrate; a configurable sector cavity antenna integrated into the PCB, wherein the configurable sector cavity antenna includes: a first panel embedded within the first layer of the PCB, wherein the first panel includes an inner edge and an outer edge, the outer edge of the first panel is an edge of the first layer of the PCB; a second panel embedded within the second layer of the PCB, wherein the second panel includes an inner edge and an outer edge, the outer edge of the second panel is an edge of the second layer of the PCB; a switchable via wall including multiple switchable vias configurable to selectively couple multiple interior points of the first panel and the second panel with each other, wherein a switchable via of the multiple switchable vias is in on or off state, and a radiation slot between the first panel and the second panel along the outer edge of the first panel and the outer edge of the second panel separated by the dielectric material.

Example 2 may include the electronic apparatus of example 1 and/or some other examples herein, wherein the configurable sector cavity antenna further includes a fixed via wall including multiple vias to couple the first panel and the second panel along the inner edge of the first panel and the inner edge of the second panel.

Example 3 may include the electronic apparatus of example 1 and/or some other examples herein, further comprising a coil antenna embedded within the first layer of the PCB around a contour of the inner edge of the first panel of the configurable sector cavity antenna and an edge of the first layer of the PCB.

Example 4 may include the electronic apparatus of example 1 and/or some other examples herein, wherein the configurable sector cavity antenna is a first sector cavity antenna, and the electronic apparatus further includes a second sector cavity antenna integrated into the PCB, wherein the second sector cavity antenna includes: a third panel embedded within the first layer of the PCB, wherein the third panel includes an inner edge and an outer edge, the outer edge of the third panel is an edge of the first layer of the PCB; a fourth panel embedded within the second layer of the PCB, wherein the fourth panel includes an inner edge and an outer edge, the outer edge of the fourth panel is an edge of the second layer of the PCB; a second fixed via wall including multiple vias to couple the third panel and the fourth panel along the inner edge of the third panel and the inner edge of the fourth panel; and a second radiation slot between the third panel and the fourth panel along the outer edge of the third panel and the outer edge of the fourth panel separated by the dielectric material.

Example 5 may include the electronic apparatus of example 4 and/or some other examples herein, wherein the first sector cavity antenna and the second sector cavity antenna encircle a continuous opening around a center of the PCB.

Example 6 may include the electronic apparatus of example 5 and/or some other examples herein, further comprising: a coil antenna embedded within the first layer of the PCB around a contour of the inner edge of the first panel, the inner edge of the third panel, and an edge of the continuous opening.

Example 7 may include the electronic apparatus of example 6 and/or some other examples herein, wherein the first sector cavity antenna and the second sector cavity antenna are to conduct multiple in multiple out (MIMO) communication, and the coil antenna is to conduct near field communication (NFC).

Example 8 may include the electronic apparatus of any of examples 1-7 and/or some other examples herein, further comprising: a semiconductor package affixed to the PCB, wherein the semiconductor package comprises at least one of radio circuitry or digital circuitry.

Example 9 may include the electronic apparatus of any of examples 1-7 and/or some other examples herein, further comprising: a display, wherein the display is located above the PCB.

Example 10 may include the electronic apparatus of example 9 and/or some other examples herein, wherein the display further includes a metallic extension, the metallic extension is located in front of the radiation slot of the configurable sector cavity antenna to conceal the radiation slot while allowing for radiation through the radiation slot.

Example 11 may include an electronic apparatus, comprising: a printed circuit board (PCB), wherein the PCB has a first layer and a second layer on a substrate; a sector cavity antenna integrated into the PCB, wherein the sector cavity antenna includes: a first panel embedded within the first layer of the PCB, wherein the first panel includes an inner edge and an outer edge, the outer edge of the first panel is an edge of the first layer of the PCB; a second panel embedded within the second layer of the PCB, wherein the second panel includes an inner edge and an outer edge, the outer edge of the second panel is an edge of the second layer of the PCB; a fixed via wall including multiple vias to couple the first panel and the second panel along the inner edge of the first panel and the inner edge of the second panel; and a radiation slot between the first panel and the second panel along the outer edge of the first panel and the outer edge of the second panel separated by the dielectric material; and a coil antenna embedded within the first layer of the PCB around a contour of the inner edge of the first panel and an edge of the first layer of the PCB.

Example 12 may include the electronic apparatus of example 11 and/or some other examples herein, wherein the sector cavity antenna further includes a switchable via wall including multiple switchable vias configurable to selectively couple multiple interior points of the first panel and the second panel with each other, wherein a switchable via of the multiple switchable vias is in on or off state.

Example 13 may include the electronic apparatus of example 11 and/or some other examples herein, wherein the sector cavity antenna is a first sector cavity antenna, and the electronic apparatus further includes a second sector cavity antenna integrated into the PCB, wherein the second sector cavity antenna includes: a third panel embedded within the first layer of the PCB, wherein the third panel includes an inner edge and an outer edge, the outer edge of the third panel is an edge of the first layer of the PCB; a fourth panel embedded within the second layer of the PCB, wherein the fourth panel includes an inner edge and an outer edge, the outer edge of the fourth panel is an edge of the second layer of the PCB; a second fixed via wall including multiple vias to couple the third panel and the fourth panel along the inner edge of the third panel and the inner edge of the fourth panel, and a second radiation slot between the third panel and the fourth panel along the outer edge of the third panel and the outer edge of the fourth panel separated by the dielectric material.

Example 14 may include the electronic apparatus of example 13 and/or some other examples herein, wherein the first sector cavity antenna and the second sector cavity antenna encircle a continuous opening, and the coil antenna is around a contour of the inner edge of the first panel, the inner edge of the third panel, and an edge of the continuous opening.

Example 15 may include the electronic apparatus of example 14 and/or some other examples herein, wherein the first sector cavity antenna and the second sector cavity antenna are to conduct multiple in multiple out (MIMO) communication, and the coil antenna is to conduct near field communication (NFC).

Example 16 may include the electronic apparatus of any of examples 11-15 and/or some other examples herein, further comprising: a semiconductor package affixed to the PCB, wherein the package comprises at least one of radio circuitry or digital circuitry.

Example 17 may include the electronic apparatus of any of examples 11-15 and/or some other examples herein, further comprising: a display, wherein the display is located above the PCB.

Example 18 may include the electronic apparatus of example 17 and/or some other examples herein, wherein the display further includes a metallic extension, the metallic extension is located in front of the radiation slot of the sector cavity antenna to conceal the radiation slot while allowing for radiation through the radiation slot.

Example 19 may include a computing device, comprising: a processor; a memory device coupled to the processor; a display coupled to the processor, a printed circuit board (PCB) coupled to the processor, wherein the PCB has a first layer and a second layer on a substrate, and the PCB is located underneath the display; a first sector cavity antenna integrated into the PCB, wherein the first sector cavity antenna includes: a first panel embedded within the first layer of the PCB, wherein the first panel includes an inner edge and an outer edge, the outer edge of the first panel is an edge of the first layer of the PCB; a second panel embedded within the second layer of the PCB, wherein the second panel includes an inner edge and an outer edge, the outer edge of the second panel is an edge of the second layer of the PCB; a first fixed via wall including multiple vias to couple the first panel and the second panel along the inner edge of the first panel and the inner edge of the second panel, and a first radiation slot between the first panel and the second panel along the outer edge of the first panel and the outer edge of the second panel separated by the dielectric material; and a second sector cavity antenna integrated into the PCB, wherein the second sector cavity antenna includes: a third panel embedded within the first layer of the PCB, wherein the third panel includes an inner edge and an outer edge, the outer edge of the third panel is an edge of the first layer of the PCB; a fourth panel embedded within the second layer of the PCB, wherein the fourth panel includes an inner edge and an outer edge, the outer edge of the fourth panel is an edge of the second layer of the PCB; a second fixed via wall including multiple vias to couple the third panel and the fourth panel along the inner edge of the third panel and the inner edge of the fourth panel; and a second radiation slot between the third panel and the fourth panel along the outer edge of the third panel and the outer edge of the fourth panel separated by the dielectric material.

Example 20 may include the computing device of example 19 and/or some other examples herein, wherein the first sector cavity antenna further includes a switchable via wall including multiple switchable vias configurable to selectively couple multiple interior points of the first panel and the second panel with each other, wherein a switchable via of the multiple switchable vias is in on or off state.

Example 21 may include the computing device of example 19 and/or some other examples herein, wherein the first sector cavity antenna and the second sector cavity antenna encircle a continuous opening of the PCB, and the computing device further includes a coil antenna embedded within the first layer of the PCB around a contour of the inner edge of the first panel, the inner edge of the third panel, and an edge of the continuous opening.

Example 22 may include the computing device of example 21 and/or some other examples herein, wherein the first sector cavity antenna and the second sector cavity antenna are to conduct multiple in multiple out (MIMO) communication, and the coil antenna is to conduct near field communication (NFC).

Example 23 may include the computing device of any of examples 19-22 and/or some other examples herein, further comprising: a semiconductor package affixed to the PCB, wherein the package comprises at least one of radio circuitry or digital circuitry.

Example 24 may include the computing device of any of examples 19-22 and/or some other examples herein, wherein the display further includes a metallic extension, the metallic extension is located in front of the first radiation slot of the sector cavity antenna to conceal the first radiation slot while allowing for radiation through the first radiation slot.

Example 25 may include the computing device of any of examples 19-22 and/or some other examples herein, wherein the PCB is of a circular shape, a square, a rectangular shape, an elliptical shape, or a polygon shape.

Although certain embodiments have been illustrated and described herein for purposes of description this application is intended to cover any adaptations or variations of the embodiments discussed herein. Therefore, it is manifestly intended that embodiments described herein be limited only by the claims.

What is claimed is:

1. An electronic apparatus, comprising: a printed circuit board (PCB), wherein the PCB has a first layer and a second layer on a substrate; a configurable sector cavity antenna integrated into the PCB, wherein the configurable sector cavity antenna includes: a first panel embedded within the first layer of the PCB, wherein the first panel includes an inner edge and an outer edge, the outer edge of the first panel is an edge of the first layer of the PCB; a second panel embedded within the second layer of the PCB, wherein the second panel includes an inner edge and an outer edge, the outer edge of the second panel is an edge of the second layer of the PCB; a switchable via wall including multiple switchable vias configurable to selectively couple multiple interior points of the first panel and the second panel with each other, wherein a switchable via of the multiple switchable vias is in on or off state; and a radiation slot between the first panel and the second panel along the outer edge of the first panel and the outer edge of the second panel separated by a dielectric material; and a coil antenna embedded within the PCB, within the inner edge of the first panel.

2. The electronic apparatus of claim 1, wherein the configurable sector cavity antenna further includes a fixed via wall including multiple vias to couple the first panel and the second panel along the inner edge of the first panel and the inner edge of the second panel.

3. The electronic apparatus of claim 1, wherein the coil antenna is embedded within the first layer of the PCB around a contour of the inner edge of the first panel of the configurable sector cavity antenna and an edge of the first layer of the PCB.

4. The electronic apparatus of claim 1, wherein the configurable sector cavity antenna is a first sector cavity antenna, and the electronic apparatus further includes a second sector cavity antenna integrated into the PCB, wherein the second sector cavity antenna includes:
a third panel embedded within the first layer of the PCB, wherein the third panel includes an inner edge and an outer edge, the outer edge of the third panel is an edge of the first layer of the PCB;
a fourth panel embedded within the second layer of the PCB, wherein the fourth panel includes an inner edge and an outer edge, the outer edge of the fourth panel is an edge of the second layer of the PCB;
a second fixed via wall including multiple vias to couple the third panel and the fourth panel along the inner edge of the third panel and the inner edge of the fourth panel; and
a second radiation slot between the third panel and the fourth panel along the outer edge of the third panel and the outer edge of the fourth panel separated by the dielectric material.

5. The electronic apparatus of claim 4, wherein the first sector cavity antenna and the second sector cavity antenna encircle a continuous opening around a center of the PCB.

6. The electronic apparatus of claim 5, wherein the coil antenna is embedded within the first layer of the PCB around a contour of the inner edge of the first panel, the inner edge of the third panel, and an edge of the continuous opening.

7. The electronic apparatus of claim 6, wherein the first sector cavity antenna and the second sector cavity antenna are to conduct multiple in multiple out (MIMO) communication, and the coil antenna is to conduct near field communication (NFC).

8. The electronic apparatus of claim 1, further comprising:
a semiconductor package affixed to the PCB, wherein the semiconductor package comprises at least one of radio circuitry or digital circuitry.

9. The electronic apparatus of claim 1, further comprising:
a display, wherein the display is located above the PCB.

10. The electronic apparatus of claim 9, wherein the display further includes a metallic extension, the metallic extension is located in front of the radiation slot of the configurable sector cavity antenna to conceal the radiation slot while allowing for radiation through the radiation slot.

11. An electronic apparatus, comprising: a printed circuit board (PCB), wherein the PCB has a first layer and a second layer on a substrate; a sector cavity antenna integrated into the PCB, wherein the sector cavity antenna includes: a first panel embedded within the first layer of the PCB, wherein the first panel includes an inner edge and an outer edge, the outer edge of the first panel is an edge of the first layer of the PCB; a second panel embedded within the second layer of the PCB, wherein the second panel includes an inner edge and an outer edge, the outer edge of the second panel is an edge of the second layer of the PCB; a fixed via wall including multiple vias to couple the first panel and the second panel along the inner edge of the first panel and the inner edge of the second panel; and a radiation slot between the first panel and the second panel along the outer edge of the first panel and the outer edge of the second panel separated by a dielectric material; and a coil antenna embedded within the first layer of the PCB around a contour of the inner edge of the first panel and an edge of the first layer of the PCB.

12. The electronic apparatus of claim 11, wherein the sector cavity antenna further includes a switchable via wall including multiple switchable vias configurable to selectively couple multiple interior points of the first panel and the second panel with each other, wherein a switchable via of the multiple switchable vias is in on or off state.

13. The electronic apparatus of claim 11, wherein the sector cavity antenna is a first sector cavity antenna, and the electronic apparatus further includes a second sector cavity antenna integrated into the PCB, wherein the second sector cavity antenna includes:
a third panel embedded within the first layer of the PCB, wherein the third panel includes an inner edge and an outer edge, the outer edge of the third panel is an edge of the first layer of the PCB;
a fourth panel embedded within the second layer of the PCB, wherein the fourth panel includes an inner edge and an outer edge, the outer edge of the fourth panel is an edge of the second layer of the PCB;
a second fixed via wall including multiple vias to couple the third panel and the fourth panel along the inner edge of the third panel and the inner edge of the fourth panel; and
a second radiation slot between the third panel and the fourth panel along the outer edge of the third panel and the outer edge of the fourth panel separated by the dielectric material.

14. The electronic apparatus of claim 13, wherein the first sector cavity antenna and the second sector cavity antenna encircle a continuous opening, and the coil antenna is around a contour of the inner edge of the first panel, the inner edge of the third panel, and an edge of the continuous opening.

15. The electronic apparatus of claim 14, wherein the first sector cavity antenna and the second sector cavity antenna are to conduct multiple in multiple out (MIMO) communication, and the coil antenna is to conduct near field communication (NFC).

16. The electronic apparatus of claim 11, further comprising:
a semiconductor package affixed to the PCB, wherein the package comprises at least one of radio circuitry or digital circuitry.

17. The electronic apparatus of claim 11, further comprising:
a display, wherein the display is located above the PCB.

18. The electronic apparatus of claim 17, wherein the display further includes a metallic extension, the metallic extension is located in front of the radiation slot of the sector cavity antenna to conceal the radiation slot while allowing for radiation through the radiation slot.

19. A computing device, comprising: a processor; a memory device coupled to the processor; a display coupled to the processor, a printed circuit board (PCB) coupled to the processor, wherein the PCB has a first layer and a second layer on a substrate, and the PCB is located underneath the display; a coil antenna embedded within the PCB; a first sector cavity antenna integrated into the PCB, wherein the first sector cavity antenna includes: a first panel embedded within the first layer of the PCB, wherein the first panel includes an inner edge and an outer edge, the outer edge of the first panel is an edge of the first layer of the PCB; a second panel embedded within the second layer of the PCB, wherein the second panel includes an inner edge and an outer edge, the outer edge of the second panel is an edge of the second layer of the PCB; a first fixed via wall including multiple vias to couple the first panel and the second panel along the inner edge of the first panel and the inner edge of the second panel; and a first radiation slot between the first panel and the second panel along the outer edge of the first panel and the outer edge of the second panel separated by a dielectric material; and a second sector cavity antenna integrated into the PCB, wherein the second sector cavity antenna includes: a third panel embedded within the first layer of the PCB, wherein the third panel includes an inner edge and an outer edge, the outer edge of the third panel is an edge of the first layer of the PCB; a fourth panel embedded within the second layer of the PCB, wherein the fourth panel includes an inner edge and an outer edge, the outer edge of the fourth panel is an edge of the second layer of the PCB; a second fixed via wall including multiple vias to couple the third panel and the fourth panel along the inner edge of the third panel and the inner edge of the fourth panel; and a second radiation slot between the third panel and the fourth panel along the outer edge of the third panel and the outer edge of the fourth panel separated by the dielectric material.

20. The computing device of claim 19, wherein the first sector cavity antenna further includes a switchable via wall including multiple switchable vias configurable to selectively couple multiple interior points of the first panel and the second panel with each other, wherein a switchable via of the multiple switchable vias is in on or off state.

21. The computing device of claim 19, wherein the first sector cavity antenna and the second sector cavity antenna encircle a continuous opening of the PCB, and the coil antenna is embedded within the first layer of the PCB around a contour of the inner edge of the first panel, the inner edge of the third panel, and an edge of the continuous opening.

22. The computing device of claim 21, wherein the first sector cavity antenna and the second sector cavity antenna are to conduct multiple in multiple out (MIMO) communication, and the coil antenna is to conduct near field communication (NFC).

23. The computing device of claim 19, further comprising:
 a semiconductor package affixed to the PCB, wherein the package comprises at least one of radio circuitry or digital circuitry.

24. The computing device of claim 19, wherein the display further includes a metallic extension, the metallic extension is located in front of the first radiation slot of the sector cavity antenna to conceal the first radiation slot while allowing for radiation through the first radiation slot.

25. The computing device of claim 19, wherein the PCB is of a circular shape, a square, a rectangular shape, an elliptical shape, or a polygon shape.

* * * * *